June 2, 1970
L. W. STYLES
3,515,062
RELEASABLE CLAMP FOR CLAMPING A MEMBER ON A PLAIN SIDED POLYGONAL SECTION BAR
Filed Oct. 13, 1967
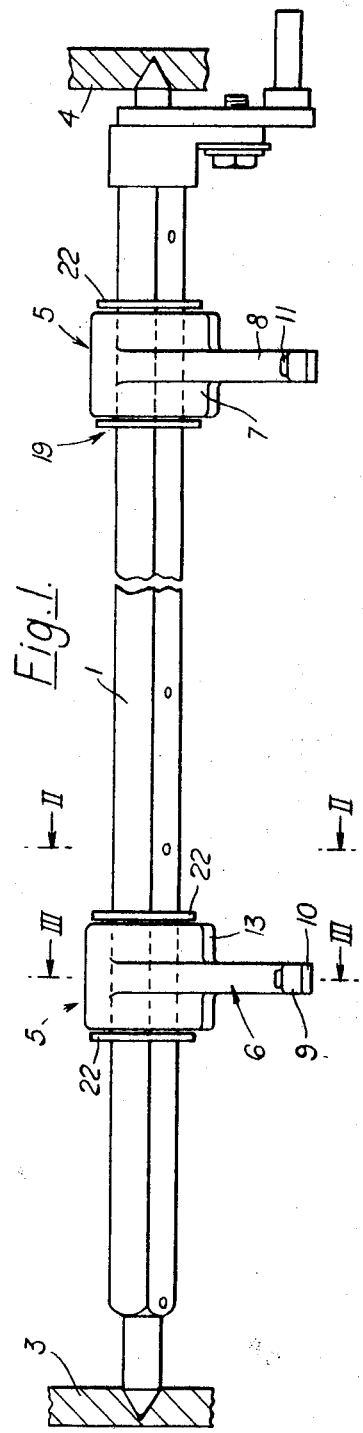
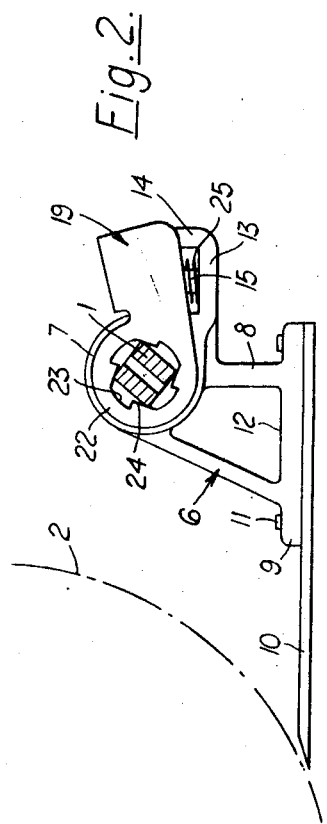
Inventor
Leonard Walter Styles
By Cushman, Darby & Cushman
Attorney Inventor
Leonard Walter Styles
By Cushman, Darby & Cushman
Attorney United States Patent Office 3,515,062
Patented June 2, 1970

3,515,062
RELEASABLE CLAMP FOR CLAMPING A MEMBER ON A PLAIN SIDED POLYGONAL SECTION BAR
Leonard Walter Styles, Tottenham, London, England, assignor to Gestetner Limited, London, England, a British company
Filed Oct. 13, 1967, Ser. No. 675,170
Claims priority, application Great Britain, Oct. 20, 1966, 47,044/66
Int. Cl. B41l *13/06*
U.S. Cl. 101—118     7 Claims

ABSTRACT OF THE DISCLOSURE

A clamp with two clamping parts for clamping a member on a polygonal cross-sectioned bar. The first clamping part has a polygonal bore fitting closely on the bar, but having some play so as to be slidable thereon. The other clamping part has a larger bore which registers with the bore in the first clamping part, and has a number of wedging projections for engaging the bar. The two parts are resiliently urged apart in a direction to tighten the projections against the bar. The clamp is particularly suitable for clamping a stripper blade on a stripper-carrying bar of a duplicating machine.

---

This invention relates to a readily releasable clamp for clamping a member on a bar or more particlarly to clamps for clamping a member on a bar of polygonal cross-section for providing ready adjustment of the position of such member longitudinally of the bar. A particularly suitable use for the clamp with which this invention is concerned is for retaining a sheet stripper on its carrying bar in a duplicating machine.

In twin cylinder and single cylinder stencil duplicating machines as well as offset lithographic duplicating machines, it is customary for a so-called stripper mechanism to be provided for stripping from the stencil, plate or printing blanket the sheets which have been duplicated. Such stripper mechanism usually comprises two blades on the delivery side of the machine and projecting towards the appropriate cylinder of the machine and terminating close to the surface thereof so that a duplicated sheet tending to stick to the stencil, plate or blanket will be engaged by these blades and stripped from the stencil, plate or blanket as this is carried around the machine. It is essential that the blades be positioned accurately since they must be sufficiently close to the surface of the stencil, plate or blanket to strip the sheet therefrom, but must not be so close or so angled as to dig into the stencil, plate, blanket or cylinder. It is also necessary for the blades to be adjustable in a position transversely of the machine so that the two blades can be positioned near to the outside edges of the sheet being duplicated whatever the width of such sheets.

In known machines, the stripper blades have been carried by members slidable on a bar extending transversely of the machine and each secured in position on such bar by means of a grub screw. In order to endeavor to ensure accuracy of positioning of the blades the bar has been of a square cross-section and each slidable member provided with a matching square cross-sectioned bore therethrough. However, so that the member should be free to slide along the bar for adjustment purposes, some measure of play has had to be given to this bore and it has been possible, when the grub screw has been released, for the member to be pivoted slightly on the bar and for the blade to dig into the stencil, plate, blanket or cylinder. Further, operators often forget to re-tighten the grub screws after adjustment and again digging of the blades into the stencil, plate, blanket or cylinder occurs.

It is an object of this invention to provide an improved form of clamp which is suitable for securing a stripper blade on a square cross-sectioned bar.

According to this invention, there is provided a clamp for clamping a member on a polygonal cross-sectioned bar, such clamp comprising two clamping parts, the first one of said parts having a polygonal bore therethrough of a cross-section matching that of the polygonal bar on which the clamp is designed to be used and the second of said parts having therethrough a bore larger than that of the first clamping part, but having projecting into such bore a plurality of wedging surfaces positioned and angled so that rotation of the bore relatively to an appropriate bar when the second clamping part is fitted thereon will, in one direction, cause the wedging surfaces to tighten on the bar and, in the opposite direction, release such surfaces from the bar, the two clamping parts being constructed to be superimposable one on the other with their bores coaxial, the clamp additionally comprising resilient means fitting between the two parts and arranged so that, when the two parts are mounted on an appropriate bar, the resilient means tend to urge the second clamping part relatively to the first clamping part in a direction about the axis of the bar in a direction tightening said wedging surfaces against the bar. The member which is to be clamped to the bar will be mounted on one of the two clamping parts, preferably the first clamping part.

In use of the clamp according to this invention, the two superimposed parts of the clamp can, when the bores of the two parts are rotated relatively to one another by compression of the said resilient means, be readily slipped over said bar. Release of the compression of the resilient means will then rotate the clamping parts relatively to one another in the opposite direction and the wedging projections will tighten against the bar and secure the clamp on the latter.

As previously indicated, the clamp of this invention is particularly suitable for clamping a stripper blade onto a square cross-sectioned bar. In this case, the blade would be fixed to the clamping part having the polygonal bore and the arrangement would be such that compression of the said resilient means to release the clamp would tend to move the blade slightly away from the cylinder of the machine so that there could be no possibility of the blade digging into such cylinder or blanket, plate or stencil thereon.

Although the clamp may have a number of the wedging projections less than the number of sides of the appropriate polygon, e.g. a wedging projection engaging only alternate sides of the polygonal bar on which the clamp is designed to be used, preferably the clamp has the same number of wedging projections as there are sides off the polygon.

In a preferred construction of the clamp, the second clamping part is of saddle form having two side plates, one fitting on either side of the first clamping part and each having a bore provided with the appropriate wedging projections, the said resilient means being located between a web portion bridging the two side plates of the saddle and an outwardly projecting lug on the first clamping part.

According to a further feature of this invention, said resilient means comprises a helical coil spring.

In order that this invention may more readily be understood, one specific embodiment of clamp designed for carrying and positioning the stripper blade of a twin cylinder stencil duplicating machine will now be described by way of example with reference to the accompanying drawing, in which:

FIG. 1 is a fragmentary front elevation of a stripper-carrying bar mounted in a twin cylinder stencil duplicating machine and carrying two clamps according to this invention;

FIG. 2 is a section through the bar of FIG. 1 on the line II—II and showing one of the clamps in side elevation and the relation of the stripper blade carried by such clamp to the printing cylinder of the duplicating machine;

Figure 3:
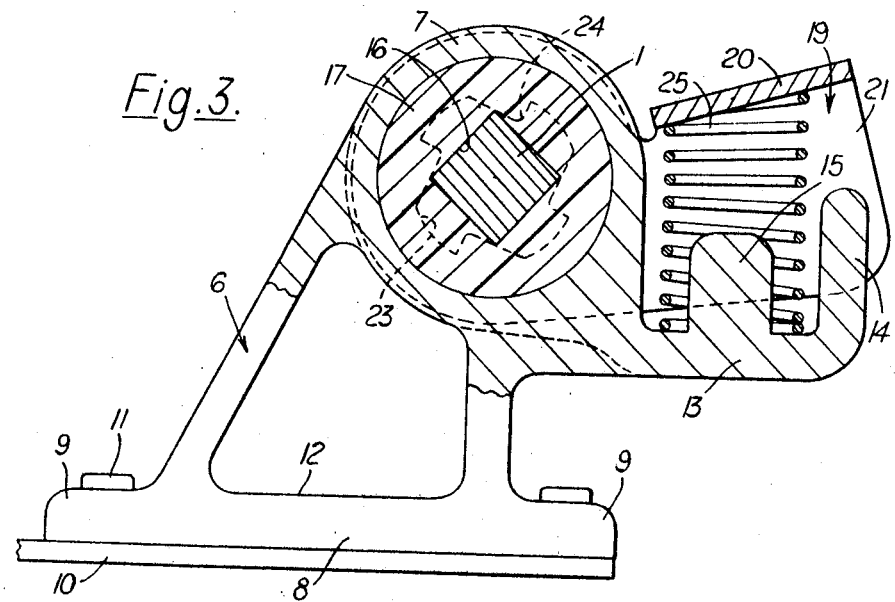
FIG. 3 is a fragmentary section on the line III—III of FIG. 1 and on a larger scale.
Figure 4:
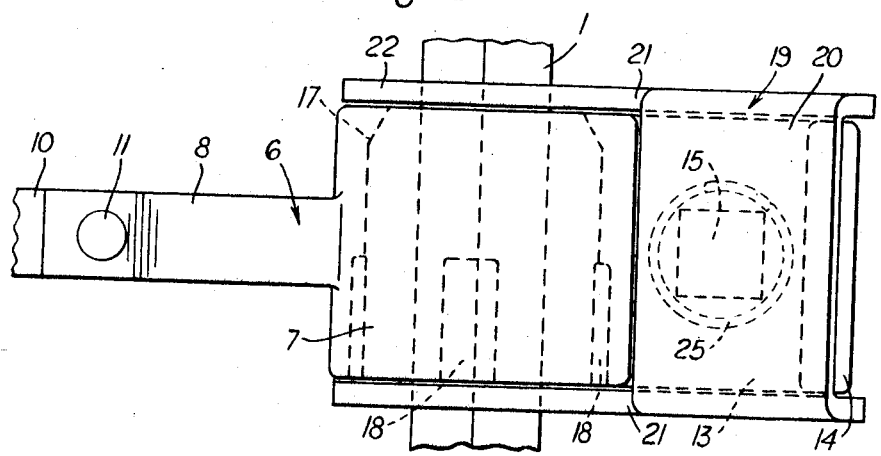
FIG. 4 is a fragmentary plan view on the same scale as FIG. 3 of one of the clamps.

The illustrated embodiment of clamp is designed to fit on the customary square cross-sectioned stripper-carrying bar which extends transversely across a twin cylinder stencil duplicating machine on the delivery side thereof and adjacent the lower cylinder of the machine. The bar is indicated in the drawing by the reference 1 and the lower cylinder of the machine is shown in chain-dotted lines at 2 in FIG. 2. As shown in FIG. 1, the bar 1 is mounted at its ends in side-plates 3 and 4 of the duplicating machine. On this bar 1, are mounted two clamps 5, these clamps being constructed according to this invention.

As will be seen clearly from the drawing, each clamp 5 comprises a first part 6 in the form of a substantially cylindrical body 7, from the centre of one part of the circumference of which outwardly projects, with its median plane at right angles to the axis of the body a bracket 8 of substantially truncated triangular shape and of a thickness less than, and advantageously as shown considerably less than, e.g. about one-third of, the axial length of the body. The side of the bracket remote from the body 7 is extended to provide lugs 9 and forms a support surface to which a stripper blade 10 is secured by screws 11 passing through the lugs 9. The bracket 8 is apertured centrally thereof as shown at 12 to reduce the weight of the part 6. Also projecting outwardly from the cylindrical body 7 is a lug 13 of the same axial length as the body, such lug being bent through a right angle near its free end, indicated by the reference 14, so that the lug defines the base and one side of an upwardly opening channel adjacent the body 7, the outer surface of the latter forming the other side of such channel. From the centre of the base of this channel and within the latter projects a square cross-sectioned stud 15.

The cylindrical body 7 has axially therethrough a square cross-sectioned bore 16 which is a sliding fit with slight play, on the bar 1. In the embodiment illustrated, the bore 16 is provided in an insert 17 which is fitted into a larger hole in the body 7, thereby enabling the body 7, together with the parts 8, 13, 14 and 15 to be formed of a light aluminium alloy, while the actual surround of the bore may be formed of a material, such as nylon, providing a smooth sliding engagement with the bar 1. Conveniently, as shown the insert 17 is of substantially cylindrical cross-section but tapers at one end portion and has at the other end portion four outwardly extending rounded keying projections 18 fitting into corresponding grooves in the hole through the body 7. The orientation of the square cross-sectioned bore 16 in relation to the blade 10 is such that, when the part 6 is mounted on the bar 1, the blade 10 is in the correct position relative to cylinder 2.

Each clamp 5 further comprises a second part 19 superimposable on the part 6, such that part 19 being formed by a saddle member having a web 20 adapted to extend over the open top of the said channel in the first clamping part 6 and two side cheeks 21 adapted to fit over the ends of the channel, each side cheek being extended at one side by a substantially circular side piece 22, adapted to embrace the body 7 of the first clamping part, one on each end thereof. Each of the side pieces 22 has therethrough an opening 23 which registers with the square cross-sectioned bore 16 of the first clamping part, such opening comprising basically a circle which is of a diameter larger than the diagonal dimension of the bore 16 and from the edge of which inwardly extend four sawtooth like projections 24 providing wedging surfaces, such surfaces being equi-angularly arranged around the axis of the bore and lying substantially along the sides of a square of the same size as the cross-section of the stripper-carrying bar 1. The projections are so positioned and angled that, when the web 20 of the saddle of the second clamping part is urged away from the base of the channel of the first clamping part, the wedging projections 24 tighten on the bar and the stripper blade 10 is urged towards the lower cylinder 2 of the machine.

To urge the two clamping parts 6 and 19 into clamping engagement with the bar 1, a helical coil spring 25 is arranged over the stud 15 so as to bear between the base of the channel provided by the lug 13 and the web 20 of the saddle of the second clamping part.

It will be appreciated, that, in use of the above described clamp with the clamping part 19 fitted over the clamping part 6, the spring 25 interposed between the parts 5, and the assembled parts fitted onto the stripper-carrying bar 1, the spring 25 urges the two clamping parts in opposite rotational directions about the axis of the bar to a position in which the wedging surfaces 24 grip the bar tightly and hold the clamp firmly in position. Release of the clamp to adjust its position along the bar is effected simply by squeezing the web 20 towards the base of the channel of the clamping part 6 so that the clamping part 19 rotates relatively to the bar and the wedging surfaces move from the bar. At the same time, the clamping part 6 tends, because of the slight play in its bore, to rotate slightly about the bar, this rotation being in a direction to move the stripper blade carried by the clamp slightly away from the lower cylinder of the machine, thereby ensuring that such stripper blade cannot dig into the latter.

Although the embodiment above described is for clamping stripper blade on a square cross-sectioned bar, it will be appreciated that the form of the clamp described could be used for securing other members on such a bar and that a clamp of similar form provided with a suitable number of wedging projections could be used for securing members on a bar having any other polygonal cross-section.

I claim:

1. A clamp for clamping a member on a polygonal cross-sectional bar, such clamp comprising a first clamping part including an outwardly projecting lug and having therethrough a polygonal bore matching the cross-section of the bar for which the clamp is designed, a second clamping part comprising two fixedly spaced apart side plates and a web portion bridging the two side plates, a bore in each of the side plates, each bore being larger than the bore in the first clamping part, a plurality of wedging projections projecting into each bore of the side plates and angled and sized such that, rotation of the bores of the second clamping part relative to an appropriate bar when the second clamping part is fitted thereon will, in one rotational direction, cause the wedging projections to tighten against the bar and, in the opposite direction, release such projections from the bar, the first and second clamping parts being superimposable one on the other with their bores coaxial and with one side plate fitting on each side of the first clamping part so that the web portion is spaced from the lug, and resilient means located between the web portion and the lug, for urging the second clamping part relative to the first clamping part in said one direction.

2. A clamp for clamping a member on a plain sided polygonal cross-sectioned bar, such clamp comprising two clamping parts, the first one of said parts having a polygonal bore therethrough of a cross-section similar to that of the polygonal bar on which the clamp is designed to be used, but providing slight play and the second of the parts having therethrough a bore larger than that of the first clamping part, a plurality of wedge-shaped projections integral with the second clamping part, the projections projecting into the bore of the second part to provide wedging surfaces or angularly spaced positions such that rotation of the bore relative to the bar when the second clamping part is fitted thereon will, in one direction cause the wedging surfaces to tighten on the bar, and in the opposite direction, release such surfaces from the bar, the two clamping parts being constructed to be superimposable one on the other with their bores registering, the clamp additionally comprising resilient means fitting between the two parts and arranged so that, when the two parts are mounted on the bar the resilient means tends to rotate the second clamping part relative to the first clamping part in a direction about the axis of the bar such as to tighten said wedging surfaces against the bar.

3. The clamp specified in claim 2, wherein the number of wedging projections is the same as the number of sides of the polygonal bore.

4. The clamp specified in claim 2 and having a duplicating machine stripper blade secured to one of the two clamping parts.

5. The clamp specified in claim 4, in which the stripper blade is secured to the first clamping part.

6. For a duplicating machine, a stripper-carrying bar assembly comprising a polygonal cross-sectioned bar, at least one clamp mounted thereon and a stripper blade secured to said clamp, said clamp comprising two clamping parts, the first one of said parts having a polygonal bore therethrough of a cross-section similar to that of said bar, but providing slight play and the second of said parts having therethrough a bore larger than that of the first clamping part, the two clamping parts being superimposed one on the other with their bores registering and the said bar passing through said registering bores, a plurality of wedge-shaped projections integral with the second clamping part, the projections projecting into the bore of the second part to provide wedging surfaces at angularly spaced positions such that rotation of said bore of the second part relative to the bar in one direction causes the wedging surfaces to tighten on the bar and rotation of said bore of the second part relative to the bar in the opposite direction releases such surfaces from the bar, and resilient means fitted between the two clamping parts and urging one said part to rotate relative to the other said part and tightening said wedging surfaces against the bar.

7. In a duplicating machine comprising a rotatable cylinder, a stripper-carrying bar assembly comprising a polygonal cross-sectioned bar, at least one clamp mounted thereon and a stripper blade secured to said clamp, said clamp comprising two clamping parts, the first one of said parts having a polygonal bore therethrough of a cross-section similar to that of said bar, but providing slight play and the second of said parts having therethrough a bore larger than that of the first clamping part, the two clamping parts being superimposed one on the other with their bores registering and the said bar passing through said registering bores, a plurality of wedge-shaped projections integral with the second clamping part, the projections projecting into the bore of the second part to provide wedging surfaces at angularly spaced positions such that rotation of said bore of the second part relative to the bar in one direction causes the wedging surfaces to tighten on the bar and rotation of said bore of the second part relative to the bar in the opposite direction releases such surfaces from the bar, and resilient means fitted between the two clamping parts and urging one said part to rotate relative to the other said part and tightening said wedging surfaces against the bar, the said bar extending transversely across the machine parallel to the cylinder and the said stripper blade extending outwardly from said clamp to a position closely adjacent the cylinder.

References Cited

UNITED STATES PATENTS

| | | | |
|---|---|---|---|
| 228,471 | 6/1880 | Nickerson et al. | 292—306 |
| 497,168 | 5/1893 | Cronan | 292—306 |
| 743,932 | 11/1903 | Rudd | 287—52.09 |
| 998,663 | 7/1911 | Wood | 101—118 |
| 1,397,450 | 11/1921 | Penny | 292—305 |
| 1,987,923 | 1/1935 | Brasseur | 101—118 |
| 2,386,450 | 10/1945 | Eller. | |
| 2,479,698 | 8/1949 | Paquin | 287—52.09 XR |
| 2,526,565 | 10/1950 | Kennard | 287—52.09 |
| 2,591,281 | 4/1952 | Musschoot | 287—52.09 XR |

ROBERT E. PULFREY, Primary Examiner

C. D. CROWDER, Assistant Examiner

U.S. Cl. X.R.

24—252; 101—232; 248—298; 287—52.09; 292—305